US00RE36421E

United States Patent [19]

Ohtsubo et al.

[11] E Patent Number: Re. 36,421

[45] Reissued Date of Patent: Nov. 30, 1999

[54] FUZZY CONTROLLER FOR SELECTING AN INPUT SIGNAL

[75] Inventors: Yutaka Ohtsubo, Takatsuki; Kazuaki Urasaki, Mukou; Yoshiro Tasaka, Kyoto; Atushi Hisano, Nagaokakyo, all of Japan

[73] Assignee: Omron Corporation, Kyoto, Japan

[21] Appl. No.: 08/751,950

[22] Filed: Nov. 19, 1996

Related U.S. Patent Documents

Reissue of:

[64] Patent No.: 5,367,610
Issued: Nov. 22, 1994
Appl. No.: 07/412,936
Filed: Sep. 26, 1989

[30] Foreign Application Priority Data

| | | | |
|---|---|---|---|
| Sep. 28, 1988 | [JP] | Japan | 63-244978 |
| Sep. 30, 1988 | [JP] | Japan | 63-247108 |
| Feb. 28, 1989 | [JP] | Japan | 1-45507 |
| Feb. 28, 1989 | [JP] | Japan | 1-45507 |
| Jun. 20, 1989 | [JP] | Japan | 1-155784 |

[51] Int. Cl.[6] ..... G06F 9/44

[52] U.S. Cl. ..... 706/4; 706/900

[58] Field of Search ..... 395/3, 51, 61, 395/900; 706/1, 4, 900

[56] References Cited

U.S. PATENT DOCUMENTS

| | | | |
|---|---|---|---|
| 3,084,862 | 4/1963 | Nathan | 708/835 |
| 4,576,570 | 3/1986 | Adams et al. | 431/12 |
| 4,804,515 | 2/1989 | Crew et al. | 376/216 |
| 4,875,184 | 10/1989 | Yamakawa | 706/3 |
| 4,903,192 | 2/1990 | Saito et al. | 364/157 |
| 5,001,640 | 3/1991 | Matsumoto et al. | 701/77 |

FOREIGN PATENT DOCUMENTS

| | | | |
|---|---|---|---|
| 5872202 | 4/1983 | Japan | G05B 11/36 |
| 60-57407 | 4/1985 | Japan | G05B 19/407 |
| 61-11804 | 1/1986 | Japan | G05B 13/02 |
| 470787 | 11/1976 | U.S.S.R. | G05B 13/02 |
| 61-0128 | 5/1978 | U.S.S.R. | G06G 7/16 |

OTHER PUBLICATIONS

Procyk, T.J. and Mamdani, "A Linguistic Self–Organizing Process Controller," Automatica, v. 15, pp. 15–30, Jan. 1979.

"Real–Time Fuzzy Control: From Linguistic Rules to Implementation on a Chip," Proc. 2nd Int'l Symp. Oct. 1987.

"A Data Converter for Analog/Fuzzy–Logic Inteface," Electronics & Communications in Japan, vol. 67–C, No. 12, pp. 106–111, Dec. 1984.

*Primary Examiner*—Robert W. Downs

*Attorney, Agent, or Firm*—Dickestein Sharpiro Morin & Oshinsky LLP

[57] ABSTRACT

In a fuzzy controller comprising a fuzzy inference device for subjecting one or a plurality of input signals to fuzzy inference operations using membership functions in accordance with a predetermined rule and outputting a non-fuzzy value determined on the basis of the results of the inferences, there are provided an input signal level converter for converting signal levels of the input signals on the input side of the fuzzy inference device and an output signal level converter for converting a signal level of the output signal on the output side of the fuzzy inference device.

23 Claims, 13 Drawing Sheets

Fig.4

| $\Delta e_n$ \ $e_n$ | NL | NM | NS | ZR | PS | PM | PL |
|---|---|---|---|---|---|---|---|
| NL | NL | NL | NM | NL | | | |
| NM | NL | NM | NM | NM | | | |
| NS | NM | NM | NS | NS | | | |
| ZR | NL | NM | NS | ZR | PS | PM | PL |
| PS | | | | PS | PS | PM | PM |
| PM | | | | PM | PM | PM | PL |
| PL | | | | PL | PM | PL | PL |

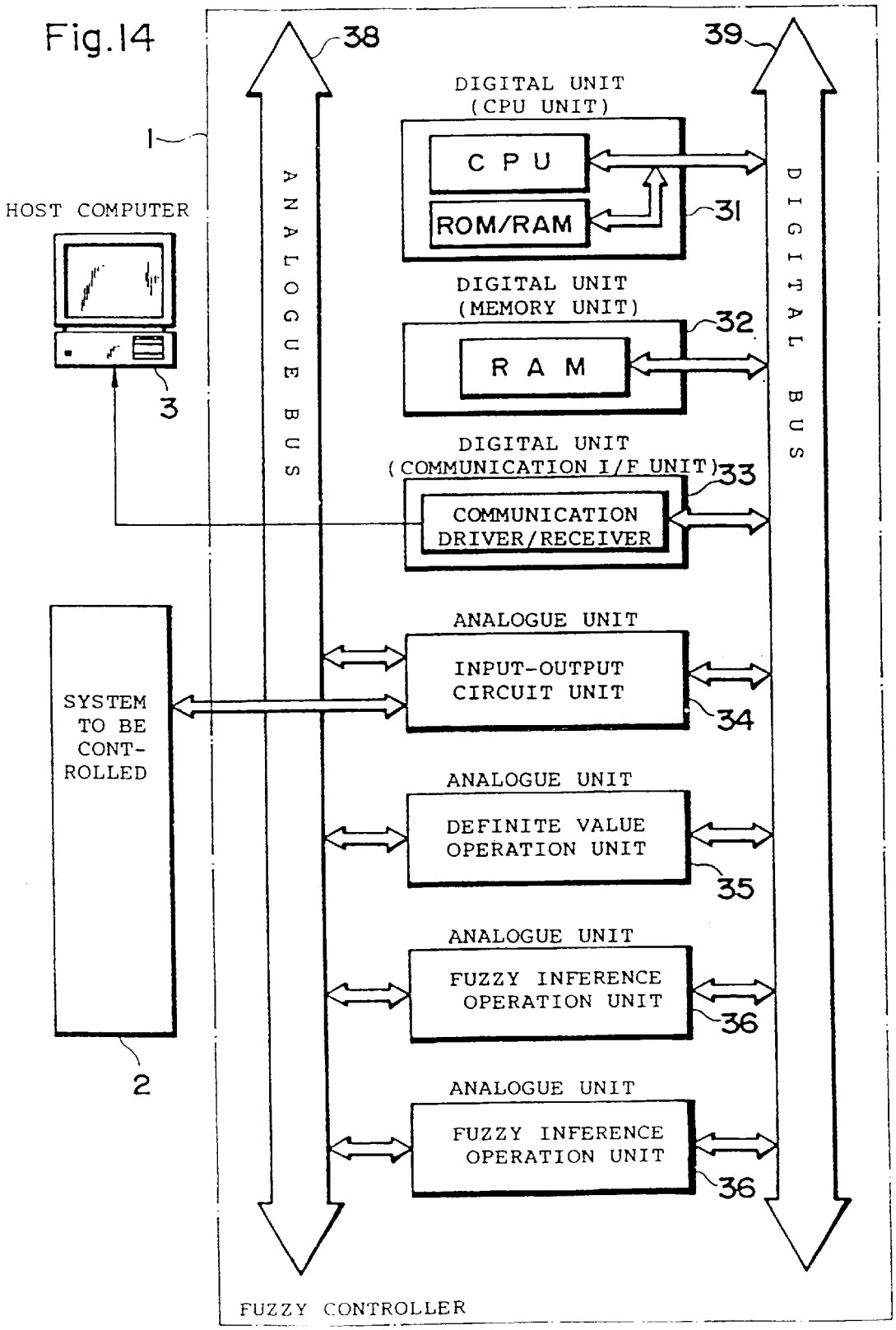
Fig.14
38
39
1
DIGITAL UNIT
(CPU UNIT)
CPU
ROM/RAM
31
HOST COMPUTER
3
ANALOGUE BUS
DIGITAL BUS
DIGITAL UNIT
(MEMORY UNIT)
32
RAM
DIGITAL UNIT
(COMMUNICATION I/F UNIT)
33
COMMUNICATION
DRIVER/RECEIVER
ANALOGUE UNIT
INPUT-OUTPUT
CIRCUIT UNIT
34
SYSTEM
TO BE
CONT-
ROLLED
ANALOGUE UNIT
DEFINITE VALUE
OPERATION UNIT
35
ANALOGUE UNIT
FUZZY INFERENCE
OPERATION UNIT
36
2
ANALOGUE UNIT
FUZZY INFERENCE
OPERATION UNIT
36
FUZZY CONTROLLER

Fig. 21

| VARIABLE | NORMALIZING PARAMETER (GAIN) | NORMALIZING PARAMETER (OFFSET) |
|---|---|---|
| $x_1$ | $k_1$ | $a_1$ |
| $x_2$ | $k_2$ | $a_2$ |
| $y_1$ | $k_3$ | $a_3$ |

FUZZY CONTROLLER FOR SELECTING AN INPUT SIGNAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to fuzzy controllers used in fuzzy control.

2. Description of the Prior Art

A fuzzy controller is used for inputting one or a plurality of signals representing controlled variables obtained from a system to be controlled, implementing fuzzy inferences using predetermined membership functions in accordance with a predetermined rule, and outputting a non-fuzzy value derived from the results of the fuzzy inferences as a manipulated variable relative to the system to be controlled.

The fuzzy inferences are implemented in accordance with a Modus Ponens, which in many cases, is expressed by an IF-THEN rule (control rule). For simplicity, when there are two types of input variables, this rule is expressed as follows:

"If x is A and y is B, then z is C."

or

"If x=A and y=B, then z=C."

Here x and y are input variables, z is an output variable, and A, B and C are fuzzy sets or membership functions. If x=A and y=B" is referred to as an "antecedent", and "then z=C" is referred to as a "consequent". A and B are also referred to as membership functions relative to inputs (input variables), and C is also referred to as a membership function relative to an output (output variable).

In the fuzzy controller, a plurality of rules are prepared. In addition, a plurality of types of membership functions are set. The membership functions frequently used include PL (Positive Large), PM (Positive Medium), PS (Positive Small), ZR (almost Zero), NS (Negative Small), NM (Negative Medium), and NL (Negative Large). The symbols PL, PM, ZR, NS, NM and NL are membership functions expressed by linguistic information, which are also referred to as fuzzy labels.

Input and output ranges of the conventional fuzzy controller are fixed. On the contrary, input and output ranges of a sensor and an actuator respectively connected to input and output terminals of the fuzzy controller are various, for example, 0~5 V, 0~10 V, 1~5 V, 5 V, and 10 V. Accordingly, the conventional fuzzy controller has the disadvantage in that a range converter is required for each sensor and for each actuator.

Furthermore, in the conventional fuzzy controller, a controlled variable (an observed value) obtained from the system to be controlled is used as an input value without any modification and a fuzzy inference value (a value converted into a non-fuzzy quantity) is used as an output value without any modification. Accordingly, the conventional fuzzy controller has some disadvantages. For example, the system to be controlled is slow in response at the time of controlling of the start and the stop thereof if the membership functions relative to the inputs and output remain fixed. In addition, the offset of the system to be controlled from a target and the vibration thereof are liable to be produced in the control in which a target value is fixed. The disadvantages occur due to the fact that the scale of the membership functions is fixed. In other words, the relationship between the inputs and output and the membership functions corresponding thereto is fixed, thereby making impossible to ensure considerable input and output gains.

Additionally, in the conventional fuzzy controller, the range in which the input variables vary is generally covered by 7 to 11 membership functions. When such a small number of membership functions are set, resolution is decreased. Therefore, even if a high-precision input value is obtained, it is difficult to exercise precise control corresponding to the precision. In particular, it is desirable that the output is controlled with higher precision in the steady state where the inputs are stable. However, this goal can not be satisfied.

The fuzzy controller the input and output dynamic ranges of which are fixed has the disadvantage of being unable to deal with a case where it is desired to execute adaptive control by varying the input and output dynamic ranges in real time.

In the fuzzy controller, the input variable in the antecedent are generally output values of the sensor, and the output variable in the consequent is, for example, a quantity of displacement of the actuator. The offset of the output value and the gain differ for each sensor and for each actuator. Accordingly, the fuzzy controller has the disadvantage in that data representing the membership functions must be adjusted, the work thereof being laborious.

SUMMARY OF THE INVENTION

An object of the present invention is to make it possible to connect a sensor and an actuator respectively having a wide variety of input and output ranges to input and output sides of a fuzzy controller without any external circuit.

Another object of the present invention is to make it possible to exercise proper control by causing a system to be controlled to quickly reach a target when the deviation of the system to be controlled from the target while reducing the vibration of the system to be controlled by fine control when the deviation from the target is small.

Still another object of the present invention is to allow control in the steady state to be executed with high precision.

A further object of the present invention is to make it possible to exercise adaptive control by varying input and output ranges in real time.

A first embodiment of the present invention is characterized by a fuzzy controller comprising fuzzy inference means for subjecting one or a plurality of input signals to fuzzy inference operations using membership functions in accordance with a predetermined rule and outputting a non-fuzzy value determined on the basis of the results of the inferences, which comprises at least one of input signal level conversion means provided on the input side of the fuzzy inference means for converting signal levels of the input signals and output signal level conversion means provided on the output side of the fuzzy inference means for converting a signal level of the output signal.

Therefore, in the fuzzy controller according to the first embodiment, even if any sensor and any actuator are respectively connected to the input side and the output side thereof, the input signals can be converted into proper signals by the input signal level convertion means, to be accepted in the fuzzy inference means without preparing any special circuit. Alternatively, the output signal of the fuzzy inference means can be converted into a proper signal by the output signal level conversion means, to be outputted. More specifically, the levels of the input and output signals of the fuzzy inference means can be freely adjusted.

A second embodiment of the present invention is characterized by a fuzzy controller comprising fuzzy inference means for subjecting one or a plurality of input signals to fuzzy inference operations using membership functions in accordance with a predetermined rule and outputting a non-fuzzy value determined on the basis of the results of the inferences, which comprises at least one of input signal conversion means provided on the input side of the fuzzy inference means and comprising an input signal conversion portion including a plurality of input signal transform functions for converting the input signals and a first selection portion for selecting any one of the input signal transform functions, and output signal conversion means provided on the output side of the fuzzy inference means and comprising an output signal conversion portion including a plurality of output signal transform functions for converting the output signal and a second selection portion for selecting any one of the output signal transform functions.

According to the second embodiment, the fuzzy controller can executes control conforming to a system to be controlled which is an object by selecting and setting the desired input and output signal transform functions. In addition, the fuzzy controller according to the second embodiment has the advantage of allowing the system to be controlled to quickly reach a target when the deviation of the system to be controlled from the target is large, while allowing the deviation of the system to be controlled from the target to be smaller as well as allowing the vibration of the system to be controlled to be decreased by fine control when the deviation from the target is small.

The third embodiment of the present invention is characterized by a fuzzy controller comprising fuzzy inference means for subjecting one or a plurality of input signals to fuzzy inference operations using membership functions in accordance with a predetermined rule and outputting a non-fuzzy value determined on the basis of the results of the inferences, which comprises scale factor control means for selecting an input signal whose absolute value is maximum out of the input signals to respectively output a multiplier and a divider corresponding to the absolute value, input-side multiplication means for applying to the fuzzy inference means a signal obtained by multiplying the value of the input signal by the multiplier obtained from the scale factor control means, and output-side division means for dividing the value of the output signal outputted form the fuzzy inference means by the divider obtained from the scale factor control means.

In the fuzzy controller according to the third embodiment, when the input value enters the steady state, the input-side multiplication means amplifies the input value on the basis of the multiplier from the scale factor control means, a fuzzy inference is implemented on the basis of the input value, and the output value representing the result of the inference is decreased by the output-side division means, thereby allowing precise output control corresponding to the input precision in the steady state.

The fourth embodiment of the present invention is characterized by a fuzzy controller comprising fuzzy inference means for subjecting one or a plurality of input signals to fuzzy inference operations using membership functions in accordance with a predetermined rule and outputting a non-fuzzy value determined on the basis of the results of the inferences, which comprises input range conversion means for converting an input signal obtained from a system to be controlled into a signal having a range suitable for the fuzzy inference means, output range conversion means for converting the non-fuzzy output obtained from the fuzzy inference means into a signal having a range required by the system to be controlled, and means for controlling range conversion by the input end output range conversion means depending on the states of the input end output signals.

In the fuzzy controller according to the fourth embodiment, there ere provided the input and output range conversion means capable of controlling conversion of the input and output ranges. Accordingly, the fuzzy controller can correspond to a wide variety of input and output conditions of a sensor and actuator connected thereto. In addition, the input and output dynamic ranges are adaptively varied between a case where a system to be controlled is greatly changed in a transient manner and a case where the system to be controlled is not greatly changed as in the steady state, thereby allowing coarse and large control when the changes are large, while allowing fine and small control when the changes are small.

The fifth embodiment of the present invention is characterized by a fuzzy controller which comprises means for storing normalizing parameters corresponding to input and output variables, first normalization means for normalizing an input signal by the normalizing parameter corresponding to the input variable stored in the storage means, means for subjecting the input signal normalized by the first normalization means to fuzzy inferences in accordance with a predetermined rule, and second normalization means for normalizing an output value obtained by the fuzzy inferences by a normalizing parameter corresponding to the output variable stored in the storage means to output the same.

The fuzzy controller according to the fifth embodiment previously preserves parameters for normalizing the offset of the output value and the gain when the gain and the offset differ for each sensor and for each actuator, to eliminate the necessity of adjusting a rule or the like, thereby allowing simple management of data constituting the rule.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2, 3, 4, 5, 6, 7, 8 and 9 show a first embodiment, where FIG. 2 is a block diagram showing the construction of a fuzzy controller; FIG. 3 is a graph showing an example of membership functions relative to input and output variables; FIG. 4 is a table showing a control rule set in the fuzzy controller, FIG. 5 is a graph showing an example of input signal transform functions; FIG. 6 is a graph for explaining that a rule to be applied varies depending on the input signal transform functions; FIG. 7 is a graph showing an example of output signal transform functions and how the shape of a membership function varies depending on the output signal transform functions; and FIGS. 8 to 9 are graphs showing how the results of inferences vary depending on the output signal transform functions;

FIG. 10 is a block diagram showing the electrical construction of a fuzzy controller, FIG. 11 is a circuit diagram showing an example of a MAX circuit in the fuzzy controller; and FIG. 12 is a circuit diagram showing an example of a scale factor control portion in the fuzzy controller, FIGS. 13, 14, 15, 16, 17, 18 and 19 show a third embodiment, where FIG. 13 is a block diagram showing the whole of the third embodiment; FIG. 14 is a block diagram showing an entire fuzzy controller system;

FIG. 15 is a block diagram showing the construction of an input-output circuit unit; FIGS. 16 and 17 are block diagrams respectively showing an example of the construction of input and output range converters; FIG. 18 is a graph showing how a control system changes; and FIG. 19 is a flowchart showing the procedure of gain control; and FIGS. 20 and 21 show a fourth embodiment, where FIG. 20 is a block diagram showing the construction of an entire fuzzy controller; and FIG. 21 is a diagram for explaining the contents stored in a rule file.

DESCRIPTION OF THE PREFERRED EMBODIMENTS

Figure 1:
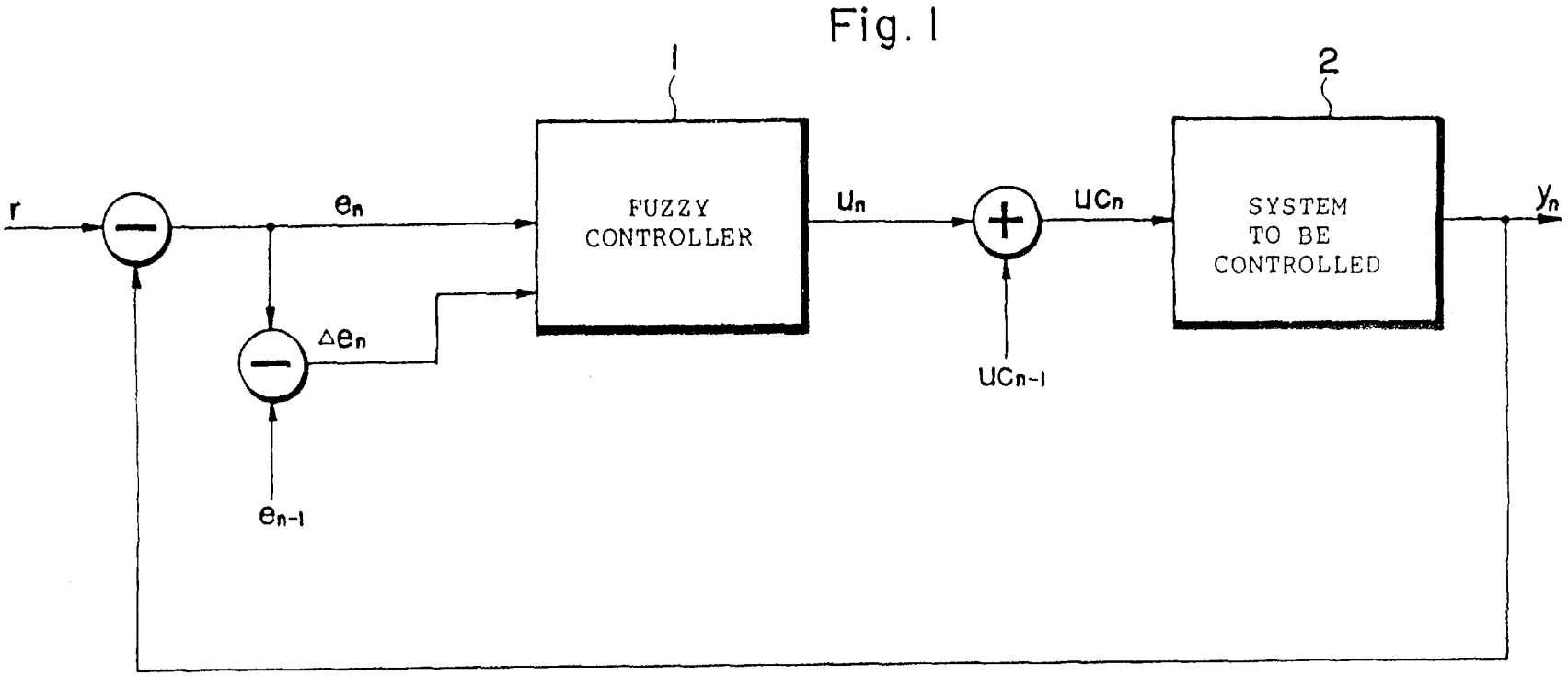
FIG. 1 is a block diagram showing the basic construction of a fuzzy control system.

FIG. 1 illustrates the entire system for controlling a system to be controlled by a fuzzy controller 1. A deviation $e_n$ between a target value r and the value of an output (a controlled variable) $y_n$ of a system to be controlled 2 and a quantity $\Delta e_n$ $[=(e_n-e_{n-1})/t]$ of change in deviation in one sampling time are inputted to the fuzzy controller 1. The fuzzy controller 1 implements inferences using the deviation $e_n$ and the quantity $\Delta e_n$ of change in deviation inputted and membership functions previously set in accordance with a predetermined rule, to output a quantity $u_n$ of change in manipulated variable. This quantity $u_n$ of change is added to a manipulated variable $uc_{n-1}$ obtained the last time, to obtain a manipulated variable $uc_n$ this time. The obtained manipulated variable $uc_n$ is applied to the system to be controlled 2.

EMBODIMENT 1

Figure 2:
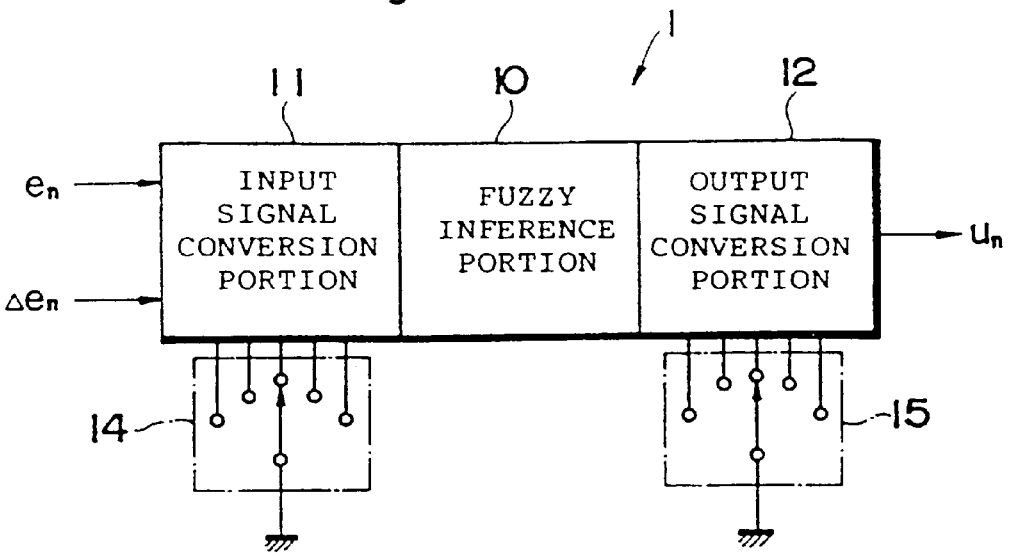

FIG. 2 illustrates the construction of a fuzzy controller according to a first embodiment. The fuzzy controller 1 comprises a fuzzy inference portion 10, an input signal conversion portion 11, an output signal conversion portion 12, a setting device 14 for selecting input signal transform functions in the input signal conversion portion 11, and a setting device 15 for selecting output signal transform functions in the output signal conversion portion 12. The input signal conversion portion 11 and the output signal conversion portion 12 respectively have a plurality of transform functions. One of the plurality of transform functions is selected and set by each of the setting devices 14 and 15. The input signal conversion portion 11 and the output signal conversion portion 12 will be described below in more detail.

The fuzzy inference portion 10 accepts the deviation $e_n$ and the quantity $\Delta e_n$ of change in deviation inputted through the input signal conversion portion 11 (the inputs converted in the conversion portion 11 are also represented by the same symbols $e_n$ and $\Delta e_n$ for convenience), implements fuzzy inferences in accordance with a predetermined rule previously set, and outputs the quantity $u_n$ of change in the manipulated variable which is the output through the output signal conversion portion 12 as the results of the inferences (the input and the output of the conversion portion 12 are represented by $u_n$ for convenience).

Figure 3:
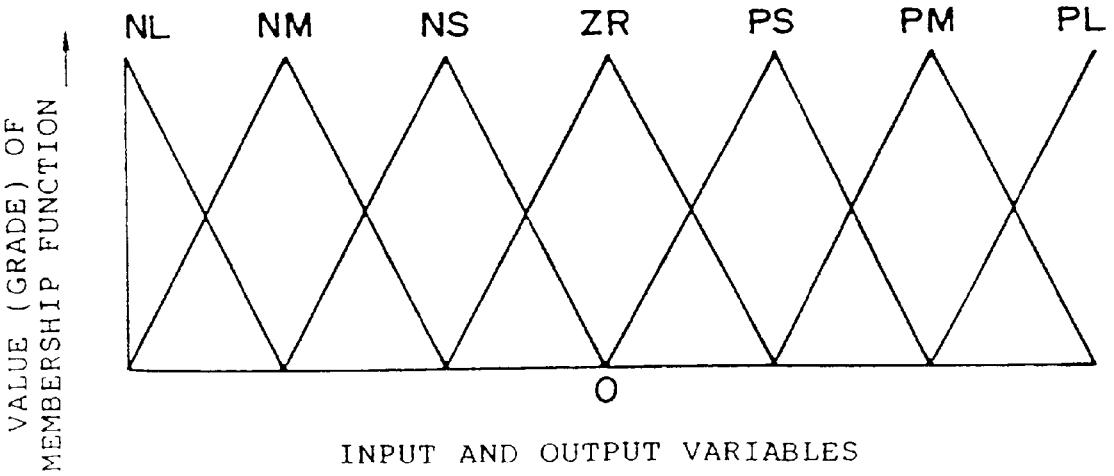

An example of membership functions with respect to input variables e and Δe and an output variable u set in the fuzzy inference portion 10 is shown in FIG. 3. The same seven types of membership functions PL to NL are used with respect to any one of the input and output variables. The membership function is not limited to a membership function of triangular shape as shown in FIG. 3. For example, a membership function of arbitrary shape can be used.

FIG. 4 shows an example of a rule used in the fuzzy inferences in the form of a table. In this rule table, labels NL, NM, . . . , PL of the membership functions with respect to the deviation e are arranged in its lateral direction and labels NL, NM, . . . , PL of the membership functions with respect to the quantity Δe of change in deviation are arranged in its longitudinal direction. Labels of the membership functions with respect to the quantity u of change in the manipulated variable which is the output are represented in divisions where the lateral and longitudinal labels intersect each other. For example, a division represented by hatching expresses the following rule:

"If e=PS and Δe=PM, then u=PM."

Figure 5:
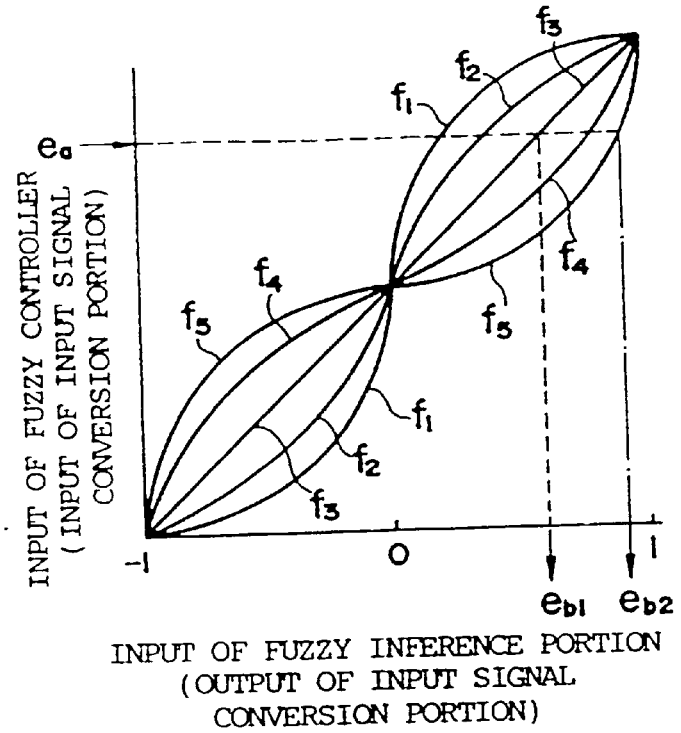
Figure 6:
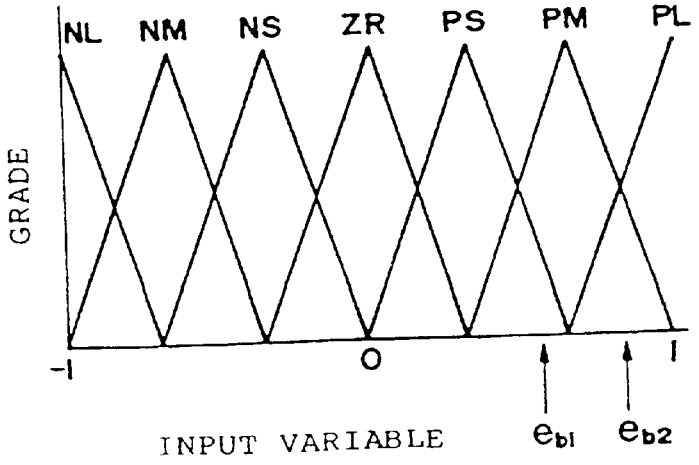

FIG. 5 shows an example of input signal transform functions $f_1$, $f_2$, $f_3$, $f_4$, and $f_5$ included in the input signal conversion portion 11. Each of the input signal transform functions represents the relation between an input signal of the conversion portion 11 (an input signal of the fuzzy controller 1) and an output signal of the conversion portion 11 (an input signal of the fuzzy inference portion 10). Any on, of the input signal transform functions is selected by the setting device 14. The input signal applied to the conversion portion 11 is converted by the selected transform function and then, applied to the fuzzy inference portion 10. For example, when the value of the inputted deviation e is $e_a$ and the selected transform function is $f_3$, the input of the fuzzy inference portion 10 becomes $e_{b1}$. As shown in FIG. 6, this input $e_{b1}$ affects the membership functions PS and PM with respect to the deviation e in the fuzzy inference portion 10.

When the setting device 14 is switched to select the transform function $f_5$, the input $e_a$ is converted into an input $e_{b2}$ by the function $f_5$, to be inputted to the fuzzy inference portion 10. This input $e_{b2}$ affects the membership functions PM and PL in the inference portion 10.

When the transform function $f_5$ is thus selected, the deviation input becomes larder than an actual one, so that an output quantity can be made larger. Accordingly, setting time at the time of controlling the start of the object to be controlled can be made fast. Moreover, more satisfactory control can be exercised in the constant-value control. The same is true in a case where the transform function $f_4$ is selected. The transform functions f4 and f5 differ in the degree of enlarging the input On the other hand, the transform functions $f_1$ and $f_2$ function to reduce the input.

Figure 7:
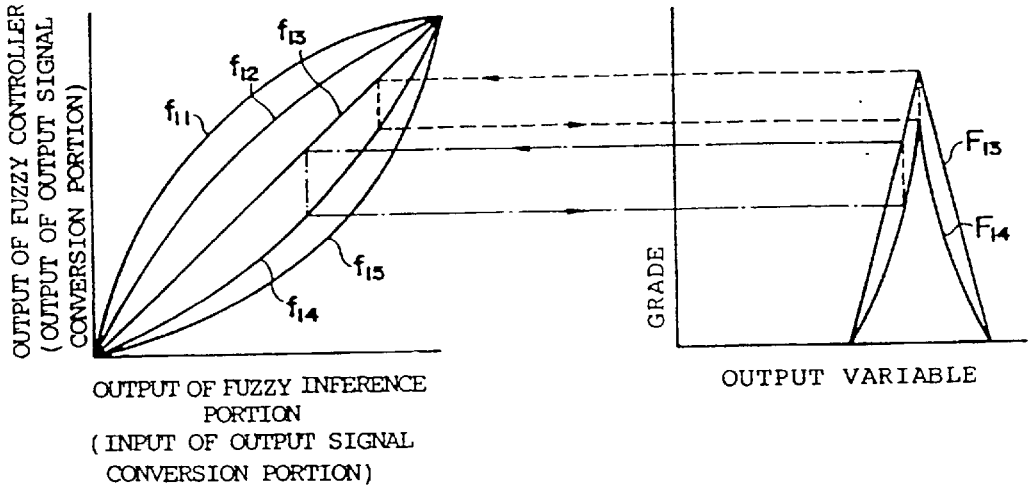
Figure 8:
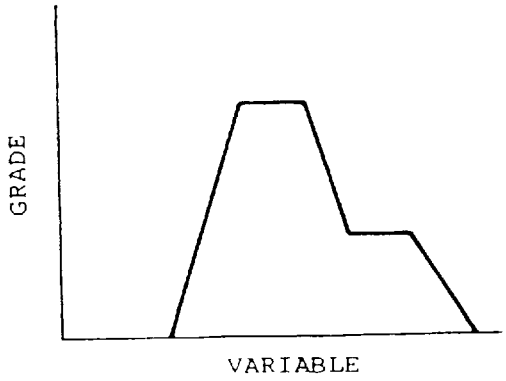
Figure 9:
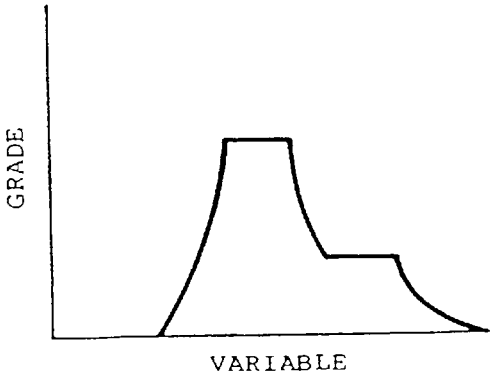

A graph on the left side in FIG. 7 shows input-output characteristics of the output signal conversion portion 12 $f_{11}$ to $f_{15}$ designate output signal transform functions included in this conversion portion 12. Assuming that a membership function $F_{13}$ in a consequent shown on the right side in FIG. 7 corresponds to the function $f_{13}$, if the function $f_{14}$ is selected, it follows that the membership function $F_{13}$ in the consequent is substantially changed into $F_{14}$. Accordingly, considering a case where the results of the inferences in the fuzzy inference portion 10 (the state before being defuzzified) is as shown in FIG. 8, if the function is switched from $f_{13}$ to $f_{14}$, then the results of the inferences are changed into those as shown in FIG. 9. As described in the foregoing, the output signal transform functions in the output signal conversion portion 12 are selected so that the output quantity can be controlled, thereby allowing fine control.

Although in the fuzzy controller according to the above described embodiment, signal convertion portions are provided on both the input and output sides, a signal conversion portion may be provided only in either one of the input and output sides.

Additionally, the fuzzy inference portion 10 and the signal conversion portions 11 and 12 can be constituted by an analogue or digital circuit having dedicated architecture, or can be realized by programming a binary computer to have the above described functions.

EMBODIMENT 2

Figure 10:
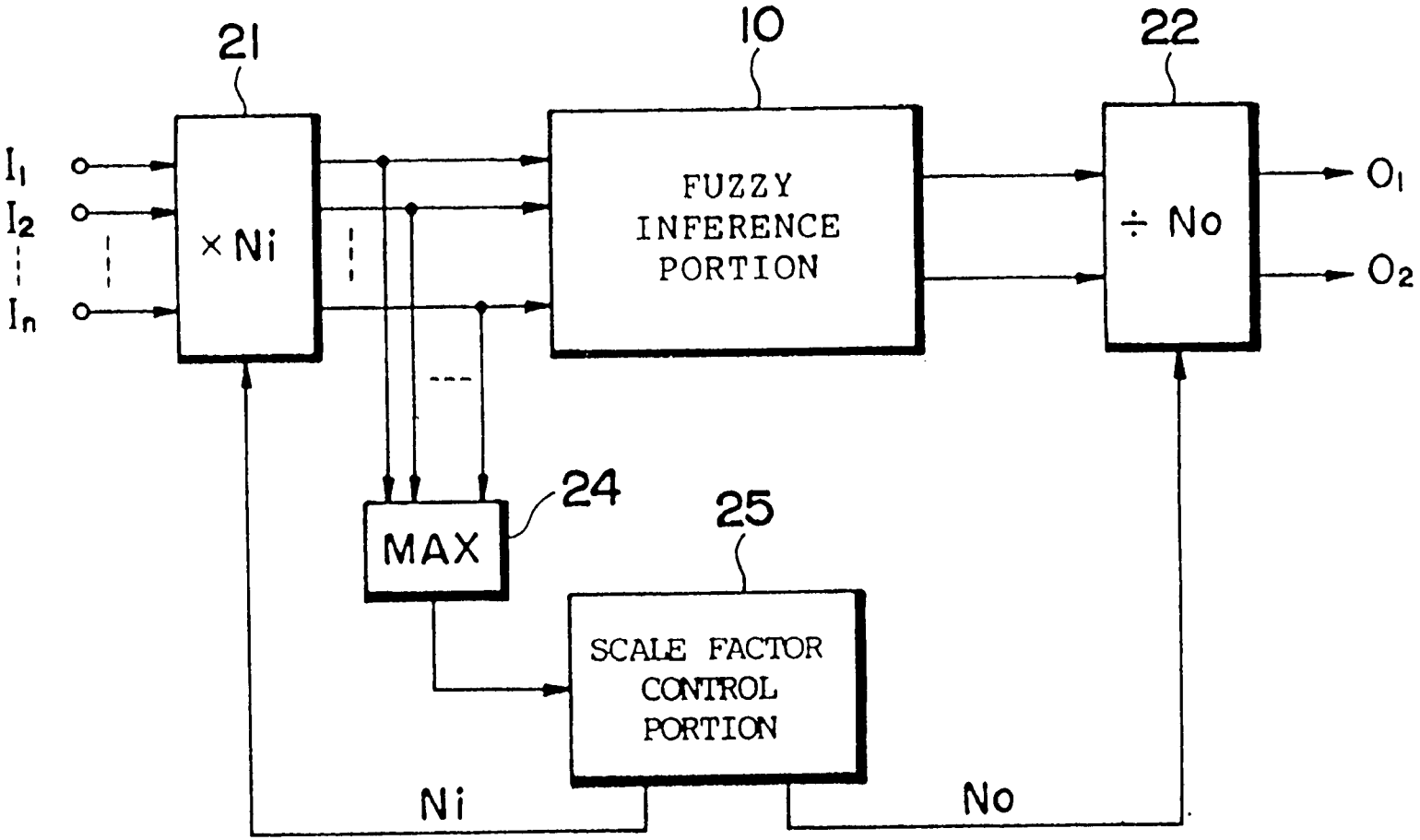
FIGS. 10, 11 and 12 show a second embodiment, where

FIG. 10 is a block diagram showing the electrical construction of a fuzzy controller according to a second embodiment of the present invention. n types of input signals of the fuzzy controller are represented by $I_1, I_2, \ldots, I_n$. Two types of outputs are provided from the fuzzy controller, which are represented by $O_1$ and $O_2$.

A multiplier array 21, which comprises n multipliers, multiplies the input signals $I_1$ to $I_n$ inputted by Ni, respectively, to send out the signals to a MAX circuit 24 and a fuzzy inference portion 10. The fuzzy inference portion 10 subjects the input signals $I_1$ to $I_n$ multiplied by Ni to fuzzy inferences, to send out outputs which are the results of the inferences to a divider array 22. The divider array 22, which comprises two dividers, divides the outputs of the fuzzy inference portion 10 by No, respectively, to provide the outputs to the exterior as the output signals $O_1$ and $O_2$. The MAX circuit 24 extracts an output having the maximum value out of the outputs of the multiplier array 21, to send out its absolute value to a scale factor control portion 25. The scale factor control portion 25 respectively applies the multiplier Ni and the divider No corresponding to the maximum value of the output to be provided to the multiplier array 21 and the divider array 22.

The levels of the input signals $I_1$ to $I_n$ inputted to the multiplier array 21 are converted into levels in the input range allowed by the fuzzy inference portion 10.

Figure 11:
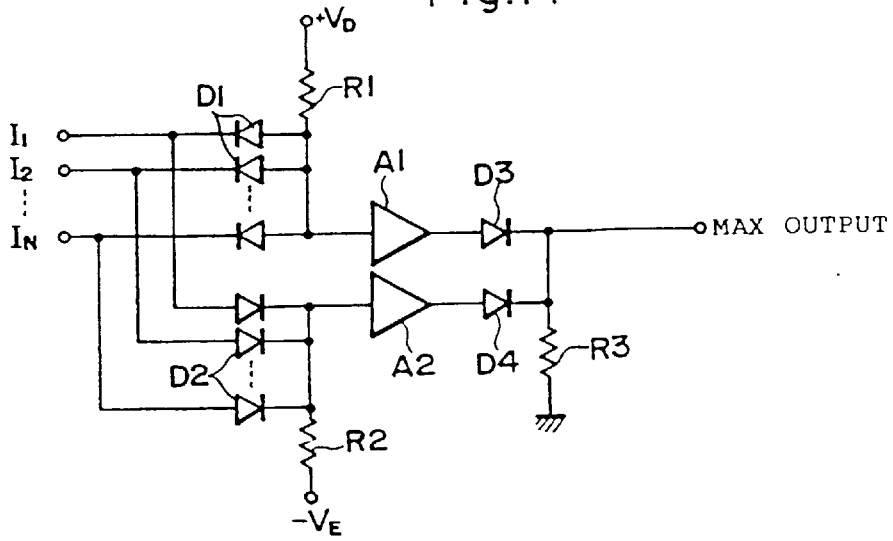

FIG. 11 is a circuit diagram showing an example of the MAX circuit 24.

Input signals $I_1$ to $I_n$ are connected together to an amplifier A1 whose gain is 1 through diodes D1 connected in the reverse direction, respectively, while being connected together to an amplifier A2 whose gain is −1 through diodes D2 connected in the forward direction, respectively. Outputs of the amplifiers A1 and A2 are respectively provided through diodes D3 and D4. Consequently, an input signal whose absolute value is maximum out of the input signals $I_1$ to $I_n$ is outputted from this MAX circuit 24 at a positive potential.

Although diodes constitute the MAX circuit 24 in FIG. 11, transistors may constitute the MAX circuit.

Figure 12:
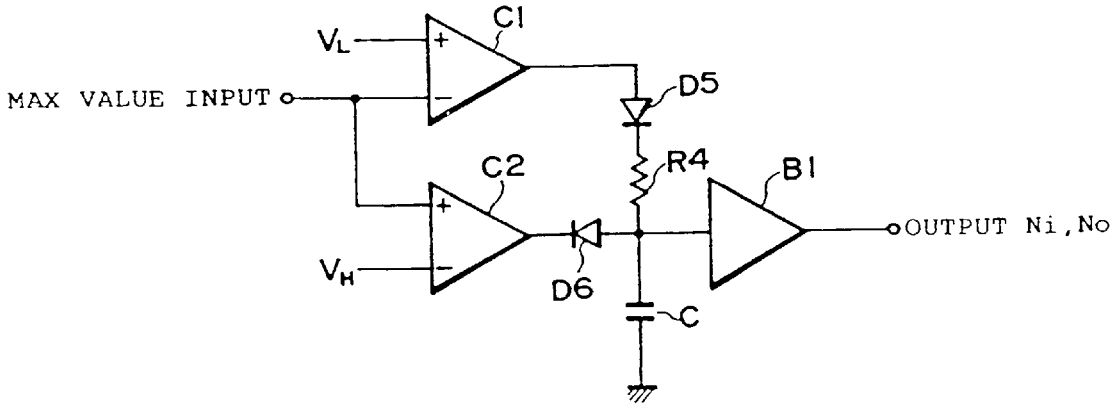

FIG. 12 is a circuit diagram showing an example of the scale factor control portion 25.

As shown in FIG. 12, the output of the MAX circuit 24 is provided to a negative terminal of a comparator C1 and a positive terminal of a comparator C2, respectively, to be compared with voltages $V_L$ and $V_H$. An output of the comparator C1 and an output of the comparator C2 are provided to a buffer amplifier B1 through a diode D5 and a resistor R4 and a diode D6, respectively. Outputs representing scale factors Ni and No are provided from this buffer amplifier B1. If the input of the buffer amplifier B1 is 0 V, the outputs Ni and No thereof are 1 V. As the input is increased to the positive, the outputs Ni and No are increased. In addition, if the MAX value input becomes a set voltage $V_L$ or less, a capacitor C connected between the input side of the buffer amplifier B1 and a ground is gradually charged, so that the outputs Ni and No are increased. On the other hand, if the MAX input value becomes a set voltage $V_H$ or more, the capacitor C is rapidly discharged, so that the outputs Ni and No approach 1.

Description is now made of the operation of the fuzzy controller constructed as described above.

If a system to be controlled rises when it begins to be driven and is subjected to disturbances, or a target value is changed, the input signals $I_1$ to $I_n$ inputted to the multiplier array 21 can cover the entire range of the above described membership functions NL to PL. Similarly, the output signals O1 and O2 can cover the entire range of the membership functions NL to PL. On this occasion, an input signal whose absolute value is maximum out of the input signals $I_1$ to $I_n$ is sent to the scale factor control portion 25 from the MAX circuit 24. The scale factor control portion 25 outputs 1 as the outputs Ni and No. As a result, the input and output signals are passed through the multiplier array 21 and the divider array 22 without any modification, respectively.

When the system to be controlled converges in the steady state, the range of changes in the input signals $I_1$ to $I_n$ narrows to the range of the membership functions NM to PM or NS to PS. When the system to be controlled further converges, the input signals $I_1$ to $I_n$ almost fall in the range of the membership function ZR. As the range of changes in the input signals $I_1$ to $I_n$ thus narrows, the MAX value sent to the scale factor control portion 25 from the MAX circuit 24 is decreased. If the MAX value becomes the set voltage $V_L$ or less, the outputs Ni and No are gradually increased to more than 1. As a result, the input signals $I_1$ to $I_n$ are multiplied by Ni, to be inputted to the fuzzy inference portion 10. The output values obtained by subjecting the input signals multiplied by Ni to fuzzy inferences, which are respectively Ni times the original values, are divided by No by the divider array 22 to be converted into normal values and then, outputted.

When the system to be controlled is changed from the steady to greatly changing state due to disturbances or the like, the MAX value sent from the MAX circuit 24 to the scale factor control portion 25 is increased. If the MAX value becomes the set voltage $V_H$ or more, the outputs Ni and No are rapidly decreased, to approach 1. The system to be controlled reacts to the changes in value of the input signals as described above, thereby improving transient response.

Meanwhile, let Ni=No with respect to the multiplier Ni and the divider No which are outputs of the scale factor control portion 25 provided that there is proportionality between the input and output signals in the steady state.

Furthermore, fuzzy rules, for example, "If $I_1$=NL and $I_2$=PM and $I_3$=PS, then $O_1$=NS.", are set in the fuzzy inference portion 10. The rules handle a plurality of input signals. Moreover, in the steady state, in many cases the input signals take stable values and only a part of the input signals affects the outputs which represents the results of the inferences. In such cases, it is preferable to give the results of the operations in an antecedent in the fuzzy inferences to the MAX circuit 24 as input signals.

Additionally, when the output Ni of the scale factor control portion 25 is increased and the outputs of the multiplier array 21 exceed the input range of the fuzzy inference portion 10, an output voltage of the multiplier array 21 should be limited within a predetermined range.

Furthermore, in the present embodiment, the input signals $I_1$ to $I_n$ take analogue values. If the input signals are digitally processed, the MAX circuit 24 monitors particular bits of the input signals to shift the bits on the basis of the results of the monitoring, thereby allowing multiplication and division processing to be easily performed.

The above described construction allows the fuzzy controller according to the present embodiment to control the steady state with high precision with no sacrifice in responsibility in a transition time period.

The fuzzy controller according to the present embodiment can be realized by not only hardware but also software.

EMBODIMENT 3

Figure 13:
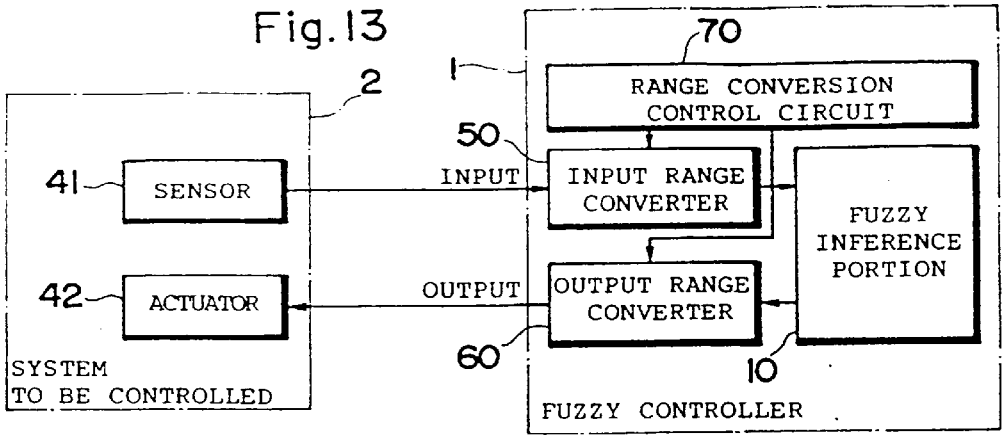

FIG. 13 illustrates a fuzzy controller according to a third embodiment of the present invention and a system to be controlled which is controlled by the fuzzy controller. In contrast with FIG. 1, a deviation e and a quantity e of change in deviation are illustrated together as a single input herein. In addition, a subtracter on the input side and an adder on the output side of the fuzzy controller are omitted.

A system to be controlled 2 comprises a sensor for sensing a controlled variable and an actuator 42 for driving the system to be controlled 2. The sensor 41 and the actuator 42 respectively have a wide variety of input and output ranges. The fuzzy controller 1 is provided with an input range converter 50, an output range converter 60, and a control circuit 70 for controlling range conversion in the input and output range converters 50 and 60 so as to correspond to the wide variety of input and output ranges. The controlled variable applied from the sensor 41 in the system to be controlled 2 is converted into a value in a range suitable for an input of a fuzzy inference portion 10 by the input range converter 50. A non-fuzzy output provided from the fuzzy inference portion 10 is converted into a value in a range required by the actuator 42 by the output range converter 60, to be outputted as a manipulated variable. Although only a single sensor 41 is illustrated in the system to be controlled 2 in FIG. 13, it goes without saying that a plurality of sensors are provided so that a plurality of types of controlled variables are applied to the fuzzy controller 1 in some cases (the cases occur more frequently). The input range converter 50 may be provided for each type of controlled variable or a plurality of types of controlled variables may be handled by a single input range converter.

FIG. 14 shows an example of the construction of an entire fuzzy controller system including the fuzzy controller 1.

The fuzzy controller 1 comprises three digital units 31 to 33 and a lot of analogue units 34 to 36. The digital unit 31 is a CPU unit, which comprises a CPU and a memory such as a ROM and a RAM. This CPU unit 31 is used for setting various types of constants, coefficients and the like in the analogue units 34 to 36 and monitoring operations of the analogue units 34 to 36. The digital unit 32 is a memory unit, which comprises, for example, a RAM storing various types of data. The digital unit 33 is a communication I/F unit, which allows the CPU in the unit 31 to communicate with a host computer 3.

The analogue unit 34 is an input-output circuit unit, which serves as an interface between the system to be controlled 2 and the other analogue unit 35 or 36. The analogue unit 36 is a fuzzy inference operation unit for subjecting an input signal representing a controlled variable applied from the system to be controlled 2 through the input-output circuit unit 34 to a predetermined fuzzy inference operation. A lot of fuzzy inference operation units 36 are provided. The analogue unit 35 is a definite value operation unit, which integrates the results of fuzzy inferences obtained from the fuzzy inference operation units 36 and determines (defuzzifies) a definite (non-fuzzy) value corresponding thereto. This non-fuzzy output is applied to the system to be controlled 2 through the input-output circuit unit 34 as a manipulated variable. The analogue units 34 to 35 are connected to each other through an analogue bus 38. Accordingly, the number of the fuzzy inference operation units 36 and the like can be arbitrarily increased or decreased.

Furthermore, the above described analogue units 34 to 36 are mutually connected to the above described digital units 31 to 33 through a digital bus 39. Consequently, various types of constants and the like of the analogue units 34 to 36 can be arbitrarily set by the CPU in the CPU unit 31 and the operations of the analogue units 34 to 36 can be monitored.

Figure 15:
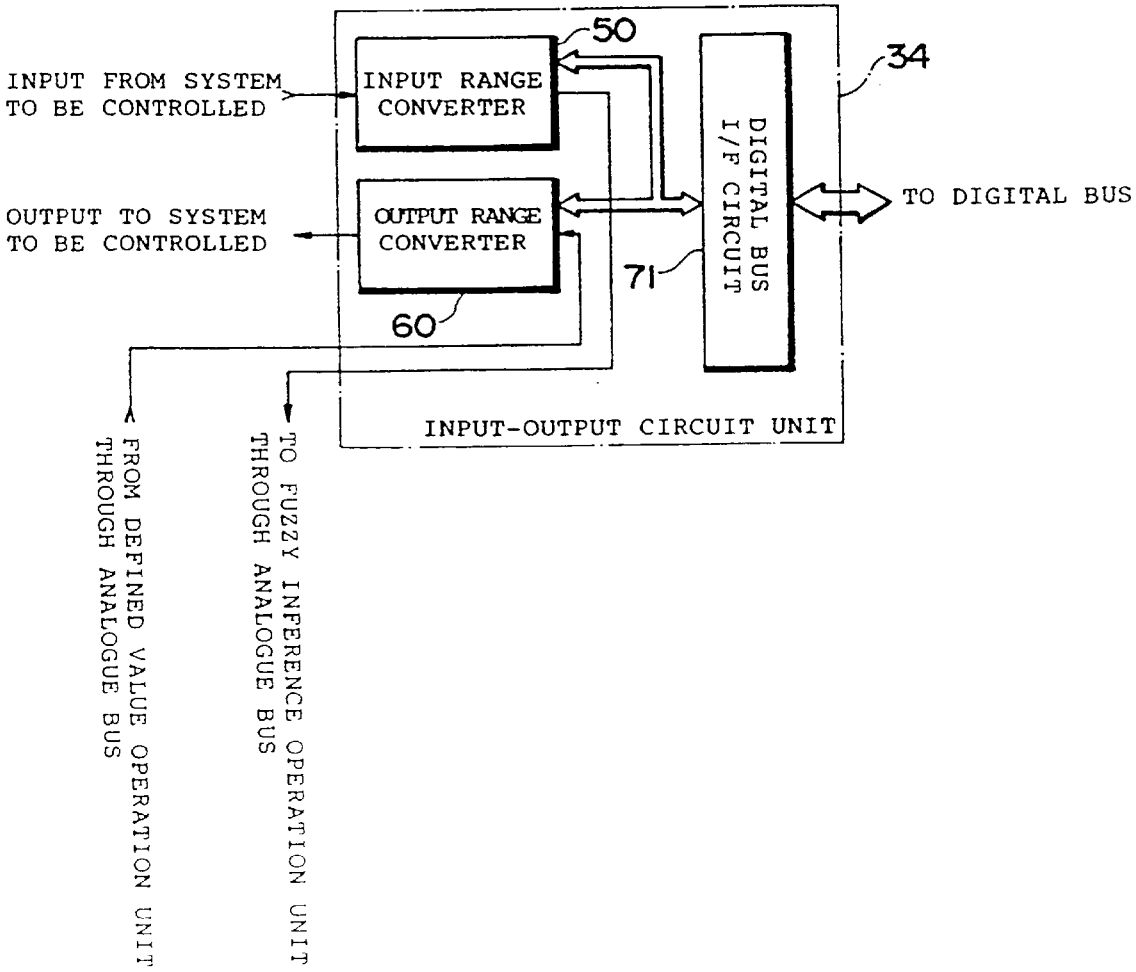

In contrast with FIG. 13, the input and output range converters 50 and 60 are included in the input-output circuit unit 34, as shown in FIG. 15. The fuzzy inference portion 10 comprises the plurality of fuzzy inference operation units 36 and the definite value operation unit 35. The range conversion control circuit 70 corresponds to the CPU unit 31. The CPU in the CPU unit 31 controls the input and output range converters 50 and 60 in the input-output circuit unit 34 through the digital bus 39 and a digital bus I/F circuit 71. The host computer 3 may be caused to perform a range conversion control function to control the input and output range converters 50 and 60 through the communication I/F unit 33. In FIG. 15, if there are a plurality of types of input signals from the system to be controlled 2, a plurality of input range converters 50 may be provided as described above.

Figure 16:
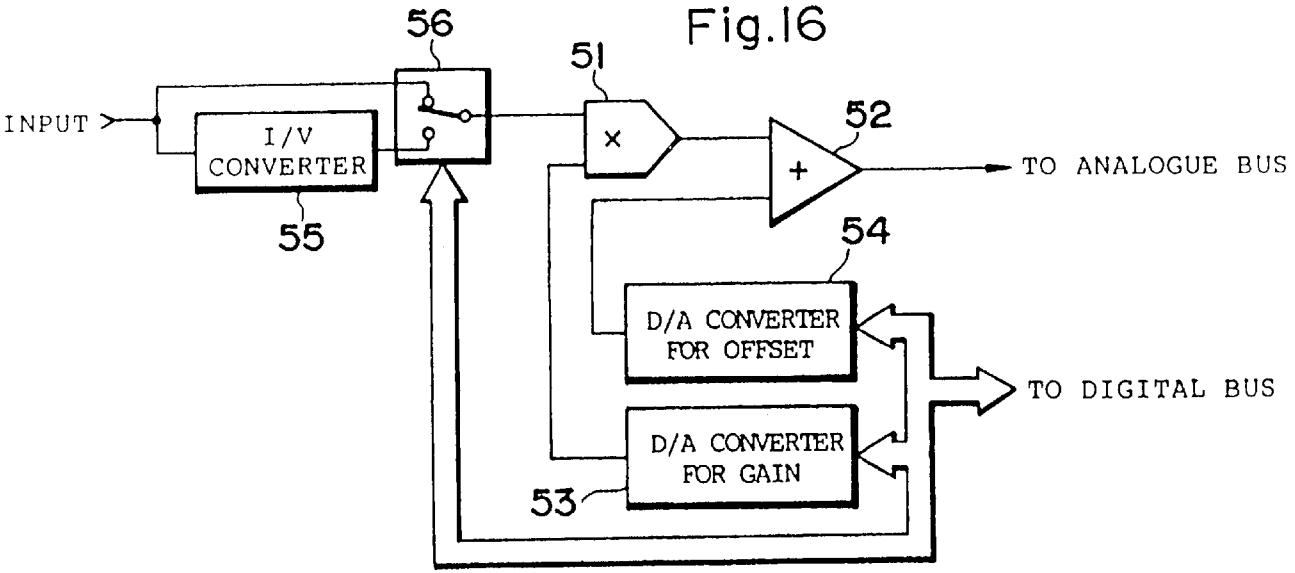

FIG. 16 shows an example of the construction of the input range converter 50. An input signal (a signal representing a controlled variable outputted from the sensor) is classified into a voltage signal and a current signal. An inputted current signal is converted into a voltage signal by an I/V converter 55. An analogue switch 56 is controlled depending on whether the input signal is the current signal or the voltage signal. In any case, the input signal is applied to a multiplier 51. Data representing the gain of the multiplier 51 is applied to a D/A converter 53 for gain through the digital bus 39. A signal representing the gain converted into an analogue signal by this D/A converter 53 is inputted to the multiplier 51. In the above described manner, the input signal is multiplied by a certain constant.

An output signal of the multiplier 51 is inputted to an adder 52. On the other hand, data representing the offset applied to a D/A converter 54 for offset through the digital bus 39 is converted into an analogue quantity, to be applied to the adder 52. Accordingly, the adder 52 adds a certain offset value to the input signal.

As described in the foregoing, a signal having any input range can be converted into a particular normalized voltage input. Data for controlling switching of the analogue switch 56, the Gain data of the multiplier 51, and the offset data of the adder 82 are applied from the CPU unit 31 through the digital bus 39, as described above. In addition, an output signal of the adder 52 is applied to the fuzzy inference operation unit 36 through the analogue bus 38 as an input signal.

Figure 17:
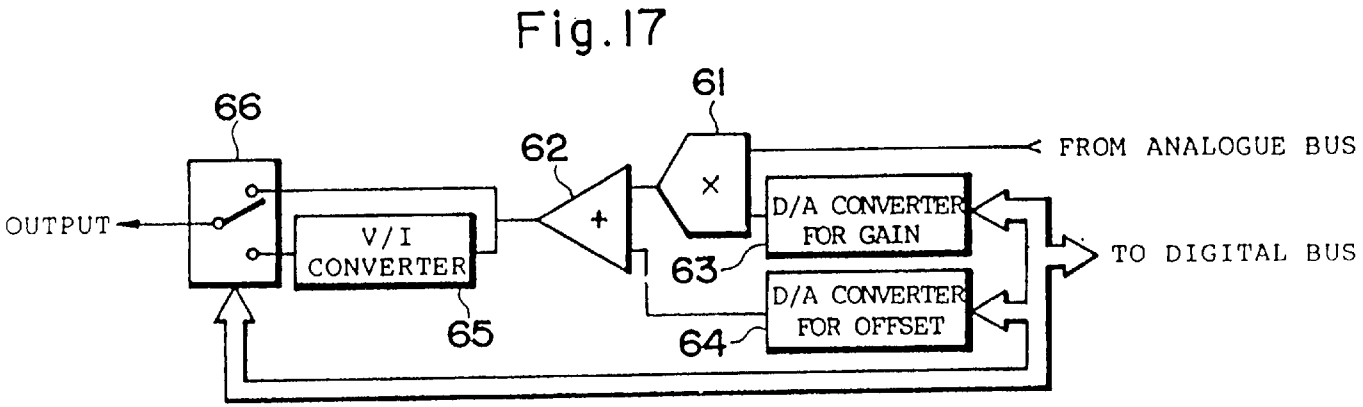

FIG. 17 shows an example of the construction of the output range converter 60. The definite (non-fuzzy) value signal outputted from the definite value operation unit 35 is a normalized output signal. This output signal is multiplied by an output of a D/A converter 63 for gain by a multiplier 61. That is, it follows that the output signal is multiplied by a certain constant. An output of the multiplier 61 is then added to an output of a D/A converter 64 for offset by an adder 62, thereby allowing the output signal to be converted into a voltage output at any level. When it is desired to convert the output signal into a current output signal, an output of a V/I converter 65 is selected by an analogue switch 66, thereby allowing the output signal to correspond to voltage and current outputs having any range.

It goes without saying that gain data and offset data respectively applied to the D/A converters 63 and 64 and data for controlling switching of the analogue switch 66 are transferred from the CPU unit 31 through the digital bus 39. An output of the analogue switch 66 is applied to the system to be controlled 2 through the input-output circuit unit 34.

Figure 18:
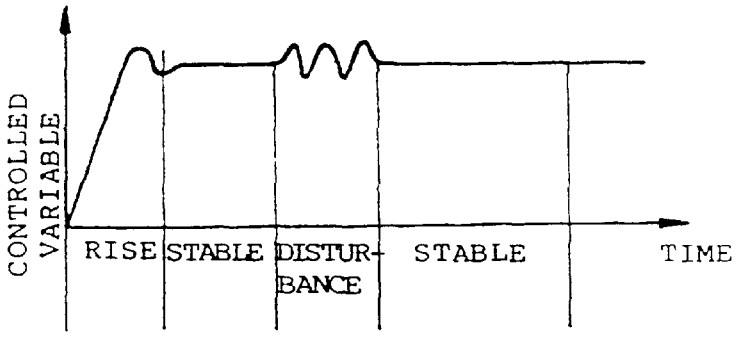
Figure 19:
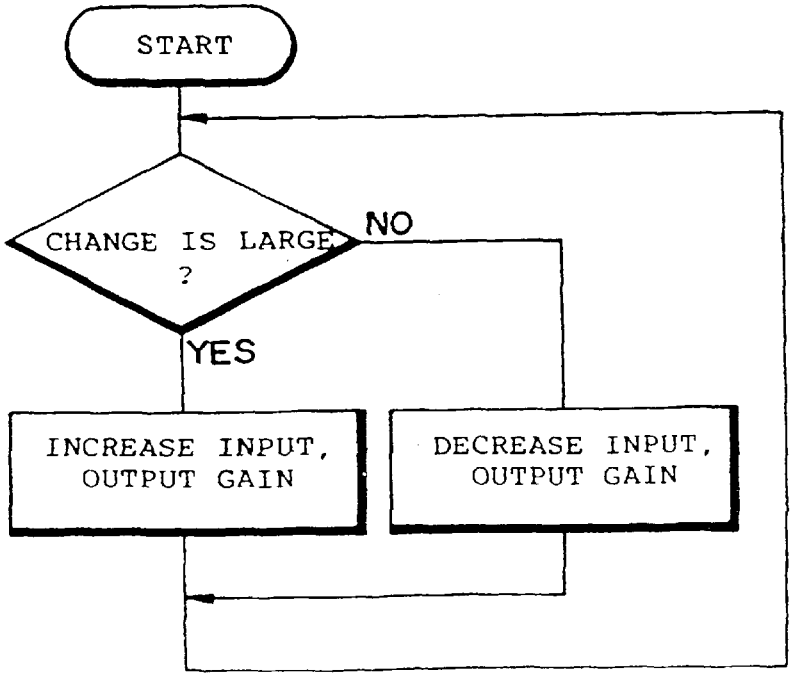

The above described level converting operations can be all controlled in real time from the CPU unit 31 through the digital bus 39. Accordingly, the of controller can executes a wide variety of control. More specifically, when the system to be controlled transiently acts, the gains applied to the D/A converters 53 and 63 for gain are increased to increase the responsibility of the entire control system so as to exercise large and coarse control. On the other hand, when the system to be controlled 2 is in the steady state, the gains are decreased to increase the stability of the entire control system. For example, in response of a given system as shown in FIG. 18, the following processing can be performed in accordance with a flowchart of FIG. 19. The input and output gains are increased to increase the responsibility when the system to be controlled significantly varies, for example, when it rises and it is subjected to disturbances, while being decreased to increase the robustness when the system to be controlled is stable.

EMBODIMENT 4

Figure 20:
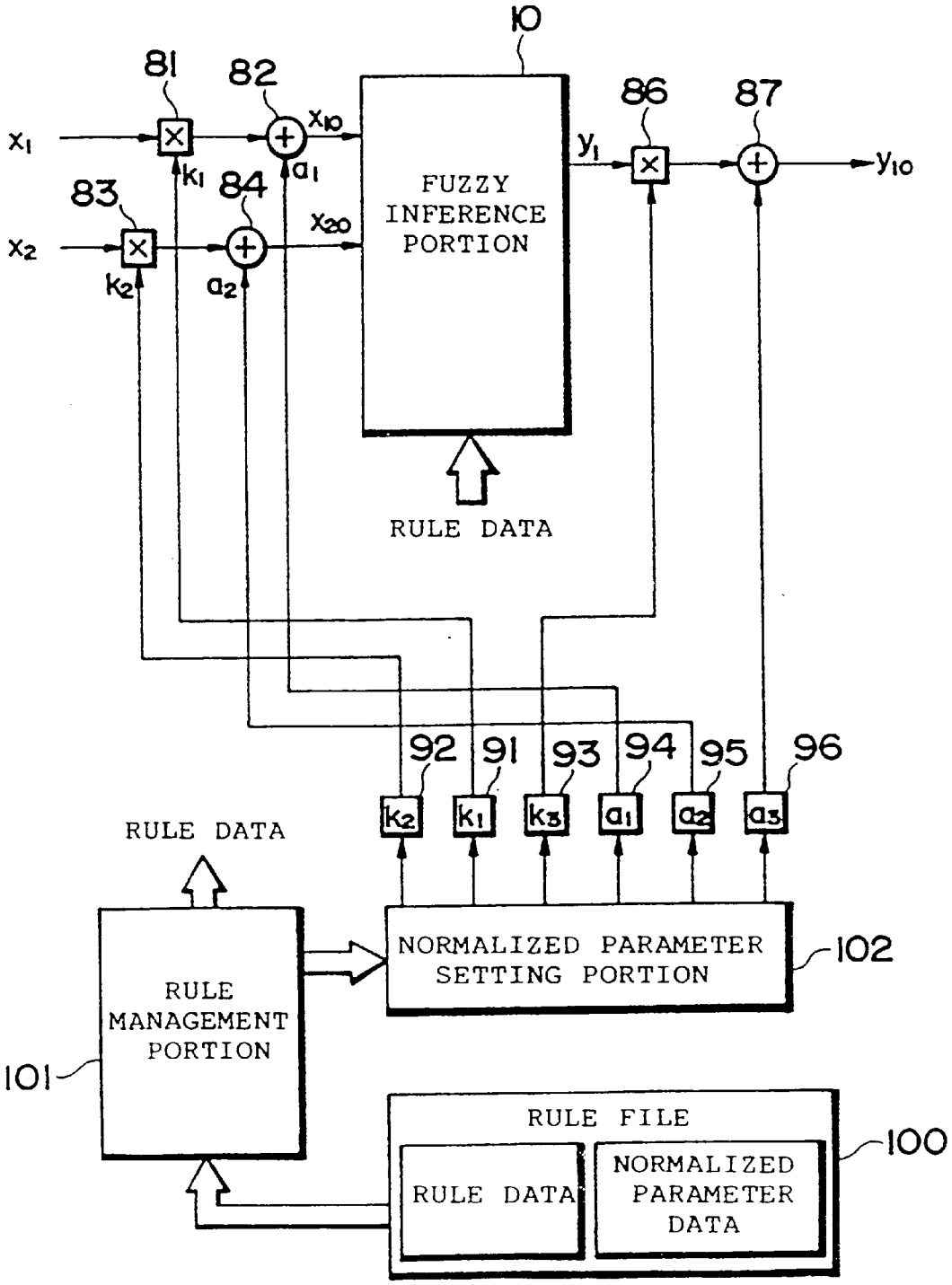

FIG. 20 is a block diagram showing a fuzzy controller according to a fourth embodiment of the present invention, and FIG. 21 is a diagram for explaining the contents stored in a rule file shown in FIG. 20.

In FIG. 20, reference numeral 81 designates a multiplier for multiplying an output value $x_1$ of a sensor (not shown) by a gain $k_1$, numeral 82 designates an adder for adding an offset value $a_1$ to an output value $k_1x_1$ of the multiplier 81, numeral 83 designates a multiplier for multiplying an output value $x_2$ of another sensor (not shown) by a gain $k_2$, and numeral 84 designates an adder for adding an offset value $a_2$ to an output value $k_2x_2$ of the multiplier 81. Outputs $x_{10}$ and $x_{20}$ of the adders 82 and 84 are applied to a fuzzy inference portion 10.

Reference numeral 86 designates a multiplier for multiplying the results of inferences (output value) of the fuzzy inference portion 10 by a gain $k_3$, and numeral 87 designates an adder for adding an offset value $a_3$ to an output value $y_1k_3$ of the multiplier 86. The above described gains $k_1$, $k_2$ and $k_3$ and the above described offset values $a_1$, $a_2$ and $a_3$ are respectively stored in registers 91 to 96.

Reference numeral 100 designates a rule file storing data representing rules for fuzzy inferences in the fuzzy inference portion 10, data representing membership functions relative to input variables $x_1$ and $x_2$ ($x_{10}$, $x_{20}$) and an output variable $y_1$ ($y_{10}$), and data representing normalizing parameters corresponding to the input and output variables. As shown in FIG. 21, the gains $k_1$, $k_2$ and $k_3$ and the offset values $a_1$, $a_2$ and $a_3$ are stored as normalizing parameters to correspond to the input and output variables $x_1$, $x_2$ and $y_1$.

Reference numeral 101 designates a rule management portion for setting the rule data and the membership function data stored in the rule file 100 in the fuzzy inference portion 10 and setting the normalizing parameter data stored therein in a normalizing parameter setting portion 102. The normalizing parameter setting portion 102 sets the normalizing parameters $k_1$, $k_2$, $k_3$, $a_1$, $a_2$ and $a_3$ in the registers 91 to 96, respectively.

Description is now made of the operation of the fuzzy controller according to the present embodiment.

In FIG. 20, when the output values $x_1$ and $x_2$ of a sensor are directly inputted to the fuzzy inference portion 10 and the output value $y_1$ of the fuzzy inference portion 10 is directly outputted to an actuator, it may, in some cases, be impossible to properly implement fuzzy inferences and suitably control the actuator depending on properties of the sensor and the actuator.

In such cases, the normalizing parameters are previously set in the rule file 100 corresponding to the properties of the sensor and the actuator. The rule management portion 101 reads out the normalizing parameters corresponding to the input and output variables constituting the rule set in the fuzzy inference portion 10 from the file 100 to apply the normalizing parameters to the normalizing parameter setting portion 102. The normalizing parameter setting portion 102 sets the normalizing parameters in the resisters 91 to 96.

Accordingly, the output values $x_1$ and $x_2$ of the sensor are respectively normalized by the multipliers 81 and 83 and the adders 82 and 84 as represented by the following equations:

$$x_{10}=k_1x_1+a_1$$

$$x_{20}=k_2x_2+a_2$$

Consequently, the fuzzy inference portion 10 can correctly implement fuzzy inferences in accordance with the rule set by the rule management portion 101.

Furthermore, the value $y_1$ representing the results of inferences correctly implemented by the fuzzy inference portion 10 is normalized by the multiplier 86 and the adder 87 as represented by the following equation and then, outputted to the actuator:

$$y_{10}=k_3y_1+a_3$$

Accordingly, the actuator is normally operated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuzzy controller comprising:

fuzzy inference means for subjecting one or a plurality of input signals to fuzzy inference operations using membership functions in accordance with a predetermined rule and outputting a non-fuzzy value determined on the basis of the results of the inference;

scale factor control means for selecting an input signal whose absolute value is a maximum value of said input signals and for respectively outputting a multiplier value and a divider value which correspond to said maximum absolute value;

input-side multiplication means for multiplying the value of said input signals by said multiplier value obtained from said scale factor control means; and output-side division means for dividing the value of said output signal outputted from said fuzzy inference means by said divider value obtained from said scale factor control means.

2. A fuzzy [logic] controller for controlling a controllable system, said fuzzy [logic] controller comprising:

a plurality of input terminals for receiving respective applied [first] *plurality of* input signals;

a fuzzy inference portion for subjecting one or a plurality of [second] *fuzzy inference* input signals to fuzzy inference operations using membership functions in accordance with a predetermined rule and outputting a non-fuzzy [signal] *value* determined on the basis of the results of the interference operation;

a scale factor control section for selecting one of said applied [first] *plurality of* input signals whose absolute value is a maximum value of said applied [first] *plurality of* input signals and for outputting a multiplier value corresponding to said maximum absolute value;

an input-side multiplier for multiplying said applied [first] *plurality of* input signals by said multiplier value obtained from said scale factor control section to produce said [second] *fuzzy inference* input signals which are applied to said fuzzy inference portion; and a controllable system connected to receive and be controlled by said non-fuzzy [signal] *value*.

3. The [apparatus] *fuzzy controller* according to claim 2, further comprising output-side division means for dividing *a signal representing* the value of said non-fuzzy output [signal] *value* outputted from said fuzzy inference means by a divider value.

4. The [apparatus] *fuzzy controller* according to claim 3, wherein said divider value is obtained from said scale factor control means which determines said divider value in correspondence with said maximum absolute value.

5. The [apparatus] *fuzzy controller* according to claims 1 or 2, wherein said scale factor control means*, or scale factor control section,* further comprises a MAX circuit for selecting [an] *a* signal value whose absolute value is a maximum of said plurality *of* input signals.

6. The [apparatus] *fuzzy controller* according to claim 5, wherein said MAX circuit comprises:

input signal receiving means, for receiving *input* signals $I_1$–$I_n$; and maximum value calculating means respectively connected to said input *signal* receiving means for providing an output signal whose absolute value is the maximum value of said input signals $I_1$–$I_n$.

7. The [apparatus] *fuzzy controller* according to claim 6, [where] *wherein* said scale factor control section *or means* comprises:

a comparator for comparing said absolute value to low and high voltage reference values; and a scale factor determining portion responsive to said comparator for providing a multiplier value and a divider value.

8. The [apparatus] *fuzzy controller* according to claim 7, wherein when said input signals $I_1$–$I_n$ fall in a steady state operation range of said controller, said multiplier and divider values produced from said scale factor control means *or section* are increased to exceed one (1).

9. The [apparatus] *fuzzy controller* according to claim 8, wherein result of said operations in said fuzzy inference means*, portion,* are provided as an antecedent to said scale factor control means *or section* as input signals.

10. The [apparatus] *fuzzy controller* according to claim 7, wherein when said signals $I_1$–$I_n$ fall in a greatly changing operational state of said controller, said multiplier and divider values are decreased by said scale factor control means *or section* to a value approaching one (1).

11. The [apparatus] *fuzzy controller* of claim 10, wherein [said] *a* signal *determined by and* outputted from said [input side] *input-side* multiplication means is limited within a predetermined range.

12. A method of fully control, comprising the steps of:

selecting one input signal whose absolute value is a maximum value out of a plurality if input signals;

determining a multiplier value corresponding to said maximum absolute value;

multiplying said plurality of input signals by said multiplier value; and subjecting said plurality of multiplied input signals to fuzzy inference operations using membership functions in accordance with predetermined rules.

*13. A fuzzy controller for controlling a controllable system, said fuzzy controller comprising:*

*a plurality of inputs for receiving input signals;*

*a first signal level adjusting circuit connected to said plurality of inputs for adjusting the signal levels of at least one input signal applied to said inputs in accordance with at least one first control signal;*

*a fuzzy inference circuit responsive to the input signals passing through said first signal level adjusting circuit for subjecting at least one of said input signals passing through said level adjusting circuit to fuzzy inference operations using at least one membership function in accordance with at least one predetermined rule, and outputting at least one non-fuzzy value determined on the basis of the results of the inference operations;*

*second signal level adjusting circuit coupled to said fuzzy inference circuit for receiving and adjusting the level of at least one of said at least one non-fuzzy value in accordance with at least one second control signal; and*

*a control circuit for supplying at least one of said first and second control signals to said first and second signal level adjusting circuits to thereby control the adjustment level of said first and second signal level adjusting circuits, said control circuit providing said first and second control signals in response to at least one third control signal applied thereto.*

*14. A fuzzy controller as in claim 13, wherein said control circuit provides said first and second control signals based at least in part on a signal characteristic of said input signals.*

*15. A fuzzy controller as in claim 13, wherein said control circuit provides said first and second control signals based at least in part on a signal characteristic of said at least one non-fuzzy value.*

*16. A fuzzy controller as in claim 15, wherein said control circuit provides said first and second control signals based at least in part on a signal characteristic of said input signals and on a signal characteristic of said at least one non-fuzzy value.*

*17. A fuzzy controller as in claim 13, wherein said control circuit provides said first and second control signals based at least in part on a signal characteristic of said input signals and on a signal characteristic of said at least one non-fuzzy value.*

*18. A fuzzy controller as in claim 13, wherein said control circuit provides said first and second control signals based at least in part on an output signal from a system which is controlled by said at least one non-fuzzy value.*

*19. The fuzzy controller of claim 13, wherein said first signal level adjusting circuit changes the gain and offset of at least one of said input signals in response to said at least one first control signal.*

*20. The fuzzy controller of claim 19, wherein said first signal level adjusting circuit includes a multiplier circuit for adjusting a gain value and an adder circuit for receiving the output of said multiplier circuit and for adjusting an offset value.*

*21. The fuzzy controller of claim 13, wherein said second signal level adjusting circuit changes the gain and offset of said at least one non-fuzzy value in response to said at least one second control signal.*

*22. The fuzzy controller of claim 21, wherein said first signal level adjusting circuit includes a multiplier circuit for adjusting a gain value and an adder circuit for receiving the output of said multiplier circuit and for adjusting an offset value.*

*23. The fuzzy controller as in claim 13, wherein said control circuit includes a CPU and a memory.*

* * * * *